United States Patent [19]
Stevens et al.

[11] Patent Number: 5,784,247
[45] Date of Patent: Jul. 21, 1998

[54] CAPACITOR HAVING AN INACTIVE CORE ELEMENT ELECTROLYTIC

[75] Inventors: James L. Stevens, Irmo; Monroe E. Fulmer, Prosperity, both of S.C.

[73] Assignee: Philips Electronics North America Corporation, New York, N.Y.

[21] Appl. No.: 725,627

[22] Filed: Oct. 3, 1996

[51] Int. Cl.$^6$ .................................................. H01G 9/00
[52] U.S. Cl. ..................... 361/523; 361/528; 361/532; 361/535; 29/25.03
[58] Field of Search .......................... 361/511, 509, 361/508, 512, 516, 517, 519, 523, 524, 528, 530, 532, 533, 520, 535, 536, 537, 538, 503; 29/25.03

[56] References Cited

U.S. PATENT DOCUMENTS 4,546,415  10/1985  Kent et al. .......................... 361/511

FOREIGN PATENT DOCUMENTS

052294A2  6/1992  European Pat. Off. ......... H01G 1/11
3296207   12/1991  Japan ............................. H01G 9/04

*Primary Examiner*—Kristine L. Kincaid
*Assistant Examiner*—Anthony Dinkins
*Attorney, Agent, or Firm*—Norman N. Spain

[57] ABSTRACT

The invention provides an improved electrolytic capacitor built having (i) an inactive core element; (ii) an active element wound around the inactive core element; and (iii) a package which houses both the active element and the inactive core element.

9 Claims, 1 Drawing Sheet

CAPACITOR HAVING AN INACTIVE CORE ELEMENT ELECTROLYTIC

BACKGROUND OF THE INVENTION

This invention pertains generally to the field of electrolytic capacitors ("elcaps") and to the construction of such capacitors in order to improve their heat dissipating properties between the internal active elements of the roll and the package (or can) in which the capacitor is encased.

Electrolytic capacitors, and specifically aluminum electrolytic capacitors, generate internal heat during operation because of fluctuating current ("ripple current") and internal resistance (Effective Series Resistance—"ESR") in accordance with the formula: Power (watts)=$I^2_{rs} \times ESR$. The heat is generated internally in the active element of the roll and must diffuse outward to the packaging (or can) before it can be carried away by convection, conduction and/or radiation to the ambient environment. Radial and axial heat flows serve to conduct the heat from the core of the capacitor to the sides and bottom of a cylindrical package in which the capacitor may be encased. Construction details of the capacitor can facilitate or introduce resistance to these heat flows. Thus, it is desirable to use construction designs for capacitors which minimize the addition of internal resistance and which facilitate the conduction of heat from the core to the outside environment.

Traditionally, the capacitance of an elcap, among other parameters, determines the dimensions and size of the roll. In the past, the smallest arbor hole (or center opening) possible was used to maximize the amount of foil in the capacitor while minimizing the size of the package or can. A common construction technique employed with this design involved the use of a "potting" material between the capacitor and the can to aid in anchoring the roll. The practice involves embedding the roll in asphalt, wax, etc. While potting anchors the roll, it does not promote efficient heat flow from the roll to the can, because the potting materials are generally insulators. Accordingly, the heat must pass through the large thermal resistance of the insulating potting compound before being diffused to the package.

Another known construction technique involves the use of indentations in the can or packaging of the capacitor to anchor the roll and promote heat transfer through contact between the can side wall and the roll at multiple points (called "rilled construction"). However, a paper "tail" is normally wound around the active element (the portion of the roll where the two electrodes are present) and is thus interposed between the active element and the can. The interposed paper tail contributes to the internal thermal resistance. This practice is particularly detrimental when the active element is small and a long paper tail must be used.

U.S. Pat. No. 4,352,147 sets forth the use of a variable arbor hole to control the roll diameter for a snug fit into the can and leave a predetermined void volume in the center of the roll for gas buildup. The use of a large variable arbor has proven to be impractical and abandoned as a commercial technique due to difficulties in process control and collapse of the resulting un-supported arbor hole (which leads to elevated ESR of the capacitor). In addition, the close control of the roll diameter required a varying number of extra turns of paper on the exterior of the roll (contributing to heat buildup) unless a very highly variable mandrel was used. Moreover, an adequate press fit between the roll and the can is almost impossible to manufacture when a variable mandrel was used. Without an extremely good press fit, small air gaps result between the can and the roll and act as insulators, thus contributing to internal resistance.

U.S. Pat. No. 4,546,415 describes the use of a small air gap between the exterior of the roll and the can with indenting (rilling) of the can to force mechanical and thermal contact at a number of points around the periphery of the roll. In addition, an indentation in the can bottom was included to help support the arbor hole against collapse. A low profile roll was also used in an attempt to shorten the axial thermal path to the can bottom and to limit the collapse of the arbor hole. Again, this construction suffers from several commercial disadvantages and was never widely practiced due, in part, to manufacturing implementation problems and arbor hole collapse.

Presently, a number of manufacturers offer variations of the techniques set forth above and in the cited patents. The variations focus on extracting heat from the roll via extended cathode foils that reach and contact the can bottom. These designs provide for rolls which mostly fill the can and are wound on standard diameter mandrels; therefore there are air gaps around the roll periphery. The cathodes are extended down beyond the anode foil to contact the can bottom. The roll is anchored by compression between the cover and the can bottom. Currently available capacitors based on the extended cathode and the rilled can construction techniques typically do not incorporate large arbor holes. Instead, extra paper is wound around the outside of the active element to permit the can to be indented (rilled) for anchoring the roll. The disadvantage of these practices is that the heat dissipation is mainly forced into the axial direction down the cathode foils to the can bottom. Thus, these designs suffer by stifling radial heat flow.

The present invention provides an electrolytic capacitor and a method of constructing the same in which internal thermal resistances are reduced and heat dissipation from the core or center of a capacitor to the packaging is increased. It is an object of the present invention to provide an electrolytic capacitor which increases the efficiency of the flow of heat from the active elements of a capacitor in both the radial and axial directions. It is also an object of the invention to provide a construction in which the arbor hole does not collapse during operation. Further, it is an object of the invention to provide a capacitor construction procedure which can be easily implemented on present capacitor manufacturing machinery.

These and other objects and advantages will become apparent to those skilled in the art upon a reading of the present disclosure. The invention will be better understood by reference to the following description taken in conjunction with the accompanying drawings.

SUMMARY OF THE INVENTION

The present invention provides a method for constructing an electrolytic capacitor in which the dissipation of heat from the active elements of the capacitor is increased. The method comprises the steps of:

(i) fashioning an inactive core element to one or more pre-determined dimensions;

(ii) fabricating an active element surrounding at least a part of the inactive core element; and (iii) housing both the inactive core element and the active element in a capacitor package.

The inactive core element may be an arbor capable of remaining in the capacitor after assembly without affecting operation of the capacitor (such as a plastic arbor), or it may be composed of wound paper, cathode foil, or a combination of both.

The invention also provides an improved electrolytic capacitor comprising:

i) an inactive core element;

(ii) an active element wound around the inactive core element; and (iii) a package which houses both the active element and the inactive core element.

DETAILED DESCRIPTION OF THE INVENTION

Figure 1:
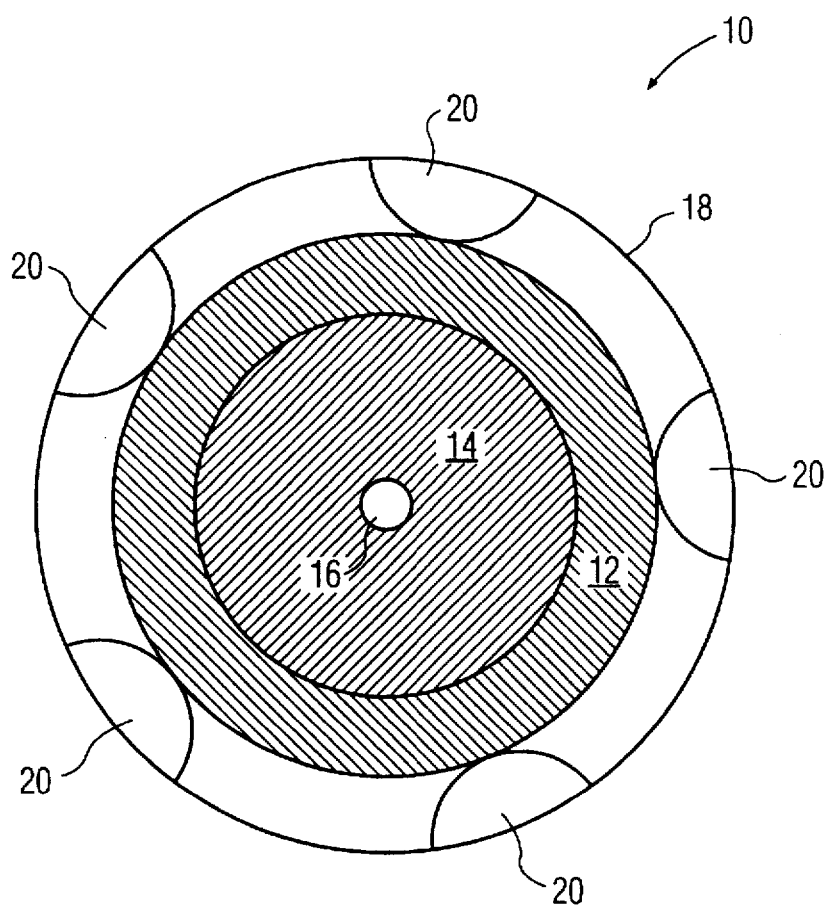
FIG. 1 depicts the cross-sectional area of an electrolytic capacitor built in accordance with the present invention.

This section details the preferred embodiments of the subject invention. These embodiments are set forth to illustrate the invention, but are not to be construed as limiting. Since this disclosure is not a primer on the manufacture of electrolytic capacitors, but rather relates to improve construction techniques and features of standard electrolytic capacitors, basic concepts and standard capacitor features known to those skilled in the art have not been set forth in detail. Details for concepts such as choosing appropriate materials for the manufacture of capacitors, selecting appropriate "potting" substances, or "rilling" the capacitor package, etc., are known or readily determinable by those skilled in the art. Attention is directed to the appropriate texts and references known to those skilled in the art for details regarding these and other concepts which may be required in the practice of the present invention; see, for example, the previously-cited patents and generally *Electrolytic Capacitors*, by Paul McKnight Deeley (The Cornell-Dubilier Elec. Corp., S. Plainfield, N.J.) (1938).

The present invention is directed to commercially available electrolytic capacitors ("elcaps") and particularly to computer grade (screw terminal) aluminum electrolytic capacitors, although it is contemplated that the invention may be used with other capacitors and other types of electrical components and devices. It is preferred that other techniques for increasing the efficiency of heat removal from the capacitor be used in conjunction with the present invention. For instance, techniques described in U.S. Pat. Nos. 4,546,415 and 4,352,147 and in British Patent No. 870,049 concerning extended cathode foils, anode foil height to roll diameter ratios, and the use of larger than normal arbors for winding the foil roll can be used in conjunction with the present invention. The disclosures of these documents are hereby incorporated by reference into the present disclosure. Additionally, other techniques known in the industry, such as "rilling" the packing surface, use of ribs or mounting spikes on the top or bottom surfaces of the package, or doming the bottom of the package, among other techniques, may all be used in conjunction with the invention.

As previously discussed, heat is generated by the ESR and ripple current in the active element of the roll and must diffuse out to the package (or can) to be dissipated to the air and surroundings. "Active element" when used herein refers to the portion of the capacitor roll wherein the anode foil is juxtapose, either directly or indirectly through an intermediate layer (typically paper), to the cathode foil.

In the present invention, it has been discovered that moving the active element (especially when small) outward closer to the capacitor can or package improves overall heat transfer. The moving of the active element outward can be done, for example, by winding extra paper and/or cathode foil on the winder mandrel before introducing the anode foil. This inverted construction (as opposed to the standard practice of placing paper on the exterior of the roll) greatly shortens the thermal conductive path between the active element and the can and reduces the core-to-package thermal resistance.

Alternatively, the active element may be wound on a detachable arbor (such as plastic) which remains in the roll during assembly of the capacitor and during its operation. It is also contemplated that the active element may be wound on a greatly enlarged mandrel, thus forming a very large arbor hole in the center, and then providing some means to prevent the collapse of the arbor hole.

For the purposes of this disclosure, the core upon which the active element is wound or otherwise internally supported will be referred to as the "inactive core element." This core element may be an arbor or spacer device capable of being left in the capacitor during operation (such as a paper, plastic or other type of core device) or it may be a portion of the roll which is inactive (e.g., where the anode foil is not juxtapose to the cathode foil, such as a roll portion composed of cathode foil alone, paper alone, or cathode foil and paper). The inactive element remains in the roll after assembly of the capacitor.

The winding of extra paper and/or cathode foil in the center of the roll to form the inactive core element before the anode foil is introduced (i.e., before beginning the winding of the active element) is the preferred embodiment of the invention.

The use of an inactive core element in the center of the roll forces the heat generating active element outward which facilitates heat flow to the package in which the roll is encased. This is particularly beneficial when the capacitor package possess indentations (or rills) since good thermal, as well as mechanical, contact with the roll is facilitated and radial heat flow is improved.

Referring to FIG. 1, an embodiment of elcap 10 of the present invention is shown. The elcap 10 has an active element 12 surrounding a paper core 14. (The paper core 14 is a particular embodiment of the "inactive core element.") Hole 16 at the center of paper core 14 is the size of a standard winding mandrel; thus, good internal radial support of active element 12 is provided by paper core 14.

Portions of the outer radial surface of active element 12 will be in substantially direct thermal contact with the surrounding can 18 at the rilled surfaces 20. (A small paper layer (not shown in FIG. 1) will still be interposed between active element 12 and can 18 to provide electrical insulation.) Thus, direct thermal contact may be provided in the radial direction between the active element and the can.

The roll of the elcap 10 of FIG. 1 may be made by first winding paper on the winding mandrel (thus creating paper core 14) and then starting the winding of the active element 12. The paper is wound to a nominal radial diameter so that the active element 12, after its subsequent winding, will be proximate to the rills 20 of the can 18 when the roll is inserted therein.

Instead of using a paper core 14, the core element of FIG. 1 may be made by winding the cathode alone, and then introducing the anode into the winding when a sufficient diameter of the core element is achieved, thus beginning the active element of the elcap.

The use of an inactive core element in accordance with the invention also circumvents the problem of collapsing arbor holes left by large mandrels, eliminates the difficulties of winding on variable diameter arbors, and reduces mechanical setup problems since paper and/or cathode foil cores can be programmed into the winder controller and disposable arbors can be made to simply insert on standard mandrels.

In conjunction with the preferred embodiments of the invention, thermal resistance is further lowered by extending the cathode foil from the bottom of the active element to the can bottom. When the cathode foil is compressed tightly against the can bottom during assembly, it provide an additional axial heat flow path to the enhanced radial heat flow path provided by the present invention as described above. Even extending the bottom paper margin and compressing it against the can bottom (without extending the cathode foil) can somewhat enhance axial heat flow. Furthermore, other heat transfer enhancing techniques known in the industry can be employed with the present invention. For instance, techniques involving the reinforcing of the can bottom with extra metal to provide increased thermal conductivity, or providing ribs or mounting spikes on the can bottom to anchor the roll, or doming the can bottom can all be practiced in conjunction with the invention. It has been found to be particularly advantageous to use the techniques of the invention in conjunction with extended cathode foils which are compressed against flat, unribbed bottoms of capacitor cans.

The present invention reduces or eliminates the extra turns of paper around the outside of the roll and the attendant insulation of the roll. The present invention also minimizes any air gaps between the roll and the can. Additionally, the invention eliminates the problem of collapsing arbor holes.

While the present invention has been described in conjunction with specific embodiments, it will be apparent to those skilled in the art that many alternatives, modifications, and variations are possible. Accordingly, it is to be understood that the invention is not limited to the specific embodiments hereof but encompasses those alternatives, modifications, and variations which fall within the spirit and scope of the appended claims and their equivalents.

What is claimed is:

1. An electrolytic capacitor comprising:

a) an inactive core element, at least the outer surface of which is solid;

b) an active element wound around the inactive core element; and c) a thermally conductive package enclosing both the active element and the inactive core element and in direct thermal contact with an outer radial surface of the active element.

2. A capacitor of claim 1, wherein the inactive core element is an arbor capable of remaining in the capacitor after assembly without affecting operation of the capacitor.

3. A capacitor of claim 2, wherein the arbor is made of plastic.

4. A capacitor of claim 1, herein the inactive core element is consisting of a combination of wound paper and cathode foil.

5. A capacitor of claim 1, wherein the inactive core element is consisting of wound paper.

6. A capacitor of claim 1, wherein the inactive core element is consisting of wound cathode foil.

7. A capacitor of claim 1, wherein the package is rilled.

8. A capacitor of claim 1, wherein the package has a ribbed or domed bottom.

9. A capacitor of claim 1, wherein the active element comprises an anode foil and a cathode foil and the package comprises a flat bottom, the cathode foil having a width greater than that of the anode foil and being in contact with the flat bottom of the package.

* * * * *